O. ROBIRDS.
Vehicle-Axle and Box.
No. 213,071. Patented Mar. 11, 1879.
Fig. 1.
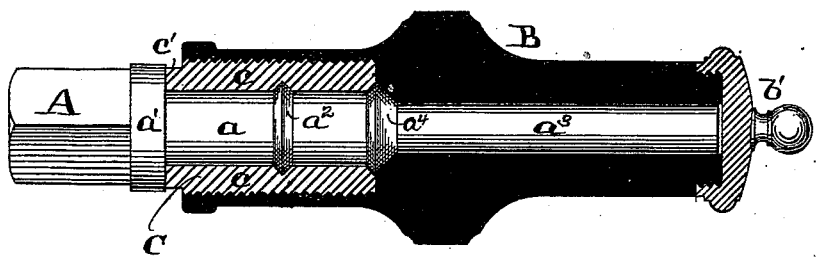
Fig. 2. Fig. 3.
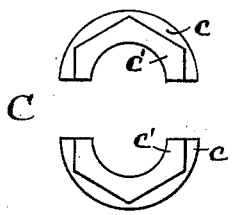 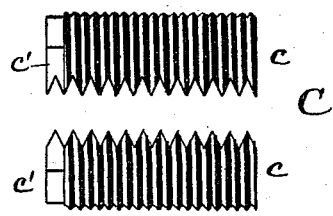
Attest
Paul Bakewell
Chas Pickles
Inventor.
Oby Robirds,
by Chas D. Moody,
atty.

UNITED STATES PATENT OFFICE.

OBY ROBIRDS, OF ST. LOUIS, MISSOURI.

IMPROVEMENT IN VEHICLE-AXLES AND BOXES.

Specification forming part of Letters Patent No. 213,071, dated March 11, 1879; application filed December 6, 1878.

*To all whom it may concern:*

Be it known that I, OBY ROBIRDS, of St. Louis, Missouri, have made a new and useful Improvement in Vehicle-Axles and Boxes, of which the following is a full, clear, and exact description, reference being had to the annexed drawings, making part of this specification, in which—

Figure 1 is a longitudinal section of the axle-box and hub, showing the axle-journal in elevation; and Figs. 2 and 3, respectively, an end and a side elevation of the axle-box.

The same letters denote the same parts.

By means of the present improvement a very durable construction is obtained. The axle is effectually prevented from having lateral movement in its bearing. The axle journal and box wear evenly together, and means are provided for readily and firmly connecting the axle, the axle-box, and hub.

It consists, mainly, in providing the axle-journal with peculiarly-shaped projections, and combining it with an axle-box made in parts.

Referring to the drawings, A represents the axle, having the journal $a$, which, from the shoulder $a^1$ outwardly, may, saving the projections $a^2$ $a^4$, be of uniform diameter throughout its length; or it may be reduced in size toward its outer end as shown at $a^3$. This reduction is desirable to provide for the insertion of the spokes in the hub. The journal proper, $a$, is provided with permanent projections or collars $a^2$ $a^4$, of the V shape shown. There may be one or more of the collars, and they may be arranged at any desirable points along the journal.

B represents the hub of the wheel. It may be of any suitable shape, saving as modified by the present improvement.

C represents the axle-box. It is made in two or more parts, $c\ c$. The box is made in parts to enable it to be attached to the axle, and when attached the axle and box are fastened in the hub, preferably by screwing the box into the hub, as shown in Fig. 1. This is an effectual mode of securing the parts, as there is not friction enough between the axle and box to cause the latter to come loose from the hub. The box is squared at its inner end, $c'$, to enable it to be screwed into its seat in the hub.

If desired, the box can be made smooth externally, and be fastened in place by set-screws. In such case the box may be square externally, or otherwise shaped, and the box-seat in the hub may be conformed thereto.

The box may be extended any desirable distance inwardly into the hub. The latter, preferably, has a cap, $b'$, at its outer end.

In place of projections $a^2$ on the journal there may be depressions, and in such case the box is provided with corresponding projections. In either event the projections and depressions are V-shaped, as shown, as thereby the wear of the journal and box upon each other proceeds with perfect evenness.

The above improvement is applicable to other than carriage-journals.

I am aware that axles having square collars have heretofore been used.

I claim—

1. The axle-journal $a$, having the V-shaped collar $a^2$, the box C, made in two or more parts, $c\ c$, and the hub B, combined and operating substantially as described.

2. The axle A, having the journal $a$, V-shaped collar $a^2$, and reduced portion $a^3$, in combination with the box $c\ c$ and hub B, substantially as described.

3. The combination of the hub B, box $c\ c$, and axle A, the latter having the journal $a$, provided with the V-shaped collar $a^4$ between the inner end of the box and the central part of the hub, substantially as described.

OBY ROBIRDS.

Witnesses:
CHAS. D. MOODY,
SAML. S. BOYD.